US006947465B2

(12) United States Patent
Nunokawa et al.

(10) Patent No.: US 6,947,465 B2
(45) Date of Patent: Sep. 20, 2005

(54) SOLID STATE LASER (75) Inventors: Hiroshi Nunokawa, Tokyo (JP);
Satoru Amano, Tokyo (JP)

(73) Assignee: ORC Manufacturing Co., Ltd., Tokyo (JP)

( * ) Notice: Subject to any disclaimer, the term of this patent is extended or adjusted under 35 U.S.C. 154(b) by 180 days.

(21) Appl. No.: 10/606,513

(22) Filed: Jun. 25, 2003

(65) Prior Publication Data

US 2004/0076212 A1 Apr. 22, 2004

(30) Foreign Application Priority Data

Oct. 18, 2002 (JP) ...................................... 2002-305003

(51) Int. Cl.⁷ ............................ H01S 3/09; H01S 3/091
(52) U.S. Cl. ........................................... 372/69; 372/78
(58) Field of Search ............................... 372/69–72, 78

(56) References Cited

U.S. PATENT DOCUMENTS

| 4,739,507 | A | * | 4/1988 | Byer et al. ..................... 372/22 |
| 4,805,177 | A | * | 2/1989 | Martin et al. .................. 372/34 |
| 5,124,999 | A | * | 6/1992 | Okazaki et al. ............... 372/69 |
| 5,182,759 | A | * | 1/1993 | Anthon et al. ................. 372/72 |
| 5,317,585 | A | * | 5/1994 | Gregor .......................... 372/35 |
| 5,341,393 | A | * | 8/1994 | Okazaki et al. ............... 372/69 |
| 5,349,660 | A | * | 9/1994 | Sutula et al. ................. 702/123 |
| 5,590,147 | A | * | 12/1996 | Hobbs et al. ................. 372/75 |
| 5,802,086 | A | * | 9/1998 | Hargis et al. ................. 372/22 |
| 6,246,711 | B1 | * | 6/2001 | Stultz et al. .................. 372/92 |
| 6,504,650 | B1 | * | 1/2003 | Alfrey .......................... 359/627 |
| 6,532,248 | B2 | * | 3/2003 | Tsunekane et al. ........... 372/72 |
| 6,608,851 | B2 | * | 8/2003 | Montagne ..................... 372/70 |

FOREIGN PATENT DOCUMENTS

| JP | 2-54588 | 2/1990 |
| JP | 4-137775 | 5/1992 |
| JP | 5-335662 | 12/1993 |
| JP | 7-307-510 | 11/1995 |

OTHER PUBLICATIONS

Efficient TEM00–mode operation of a laser–diode side–pumped Nd:YAG laser, D. Welford, D.M.Rines, B.J. Dinerman, Dec. 1, 1991, vol. 16, No. 23, Optics Letters, pp1850–1852.

Observation of Enhanced Thermal Lensing Due to Near–Gaussian Pump Energy Deposition in a Laser–Diode Side–Pumped Nd:YAG Laser, David Welford, David M. Rines, Bradley J. Dinerman, Robert Martinsen, IEEE Journal of Quantum Electronics, vol. 28, No. 4, Apr. 1992, pp. 1075–1080.

(Continued)

Primary Examiner—Minsun Oh Harvey
Assistant Examiner—Phillip Nguyen
(74) Attorney, Agent, or Firm—Dellett & Walters (57) ABSTRACT The solid state laser comprises the laser medium 11 for absorbing the pumping light 12 from the LD 10 and generating or amplifying the light having a predetermined wavelength and a heat sink comprising the first block 15a, the second block 15b and the third block 15c for aligning the laser medium 11, cooling the laser medium 11 and reflecting the pumping light 12. The laser medium 11 has an arcuate light incident surface A and a flat reflection portion. The pumping light 12 having a diffusing angle is converted into parallel light by the light incident surface A, thereby pumping the laser medium 11 uniformly. The flat reflection portion makes it easy to align laser medium 11 having anisotropic characteristic and helps to efficiently pump the laser medium 11 by reflecting the reflection light substantially in parallel with the incident light.

10 Claims, 5 Drawing Sheets

OTHER PUBLICATIONS 2,4-ns Pulse Generation in a Solid-State, Passively Q-Switched, Laser-Diode-Pumped Nd:YAG Laser, Y. Isyanova and D. Welford, OSA Proceedings on Advanced Solid-State Lasers, 1993, vol. 15, pp 20-23.

Conference on Lasers and Electro-Optics 1994, Technical Digest, vol. 8, Efficient,Side-pumped, TEM00 TM,Ho:YLF laser, John H. Flint, David M. Rines, p. 173.

Coherent Laser Radar, Jul. 23-27, 1995, 1995 Technical Digest Series, vol. 19, High Energy, Diode-Pumped Tm,Ho:YLF Laser Transmitter, John H. Flint and David M. Rines,, pp 314-317.

Letter from David Welford, Ph.D., received May 10, 2004.

* cited by examiner

- 6b
- 5b
- 7
- 91 Radius of Rod
- 4
- 5a Light Conductive Probe
- 94
- 6a Pumping Light
- 3
- 7
- 2
- 92 Radius of Reflection Mirror
- 1
- Laser Rod (refractive index: n)

Focus of Reflecting Light

SOLID STATE LASER

BACKGROUND OF THE INVENTION

1. Field of the Invention

The present invention relates generally to a solid state laser, more specifically to a solid state laser pumped by a laser diode (abbreviated as LD below) as a pumping light source. Such solid state laser is excellent in both pumping efficiency and pumping distribution as well as easy in aligning the crystal axis even in an anisotropic laser medium.

2. Description of Related Art

LD-pumped solid state lasers using a LD as a pumping light source attract considerable attention as compact, highly efficient and longer lifetime laser light sources as compared to lamp-pumped solid state lasers. In particular, performance and quality of a LD have been improved significantly in recent years, thereby accelerating practical applications of such LD-pumped all solid state lasers. Such all solid state semiconductor lasers extend lifetime to 10,000 hours as compared to 1,000 hours of conventional lamp-pumped semiconductor lasers. Additionally, since the absorbing wavelength of the solid state laser medium and the oscillation wavelength of the LD are equal to each other in the LD-pumped solid state lasers, laser crystals can be pumped highly efficiently. High quantum efficiency helps to decrease thermal lens effect, thereby significantly improving the beam quality. As for pumping methods, various types of solid state lasers have been proposed and made by utilizing the so-called side surface pumping method in which the LD is disposed in parallel with the side surface of the light axis of the oscillating light from the elongate solid state laser medium.

Widely known as the laser media to be utilized for industry-use solid state lasers are Nd:YAG crystals and Nd:YVO$_4$ crystals. Nd:YAG crystals feature high mechanical strength and excellent thermal conductivity, but are not suitable for oscillation at high pulse repetition rate over 30 kHz because of longer fluorescent lifetime. Additionally, Nb:YAG crystals are easy to handle because they have no crystal axis characteristic, thereby exhibiting no dependence to the polarizing characteristic of the pumping light in pumping efficiency. On the other hand, Nb:YVO$_4$ crystals are inferior to Nb:YAG crystals in mechanical strength and thermal conductivity but have shorter fluorescence lifetime and higher induced emission cross sectional area than Nb:YAG crystals, thereby making them more suitable material for oscillating at higher pulse repetition rate. However, since Nb:YVO$_4$ crystals have a single crystal axis, when used for laser oscillation, they not only oscillate in polarized in a particular orientation but also exhibit anisotropy in light absorbing characteristic. Since LDs tend to oscillate generally in polarized in a particular orientation as described hereinabove, the following Reference Patent 1 discloses that high pumping efficient can be achieved by choosing the orientation of polarization with respect to the crystallization.

Reference Patent 1

Japanese Un-Examined Patent Publication No. 4-137775

An example of the side surface pumping type of LD-pumped solid state laser is disclosed in the following Reference Patent 2.

Reference Patent 2

Japanese Un-Examined Patent Publication No. 2-54588

Figure 6:
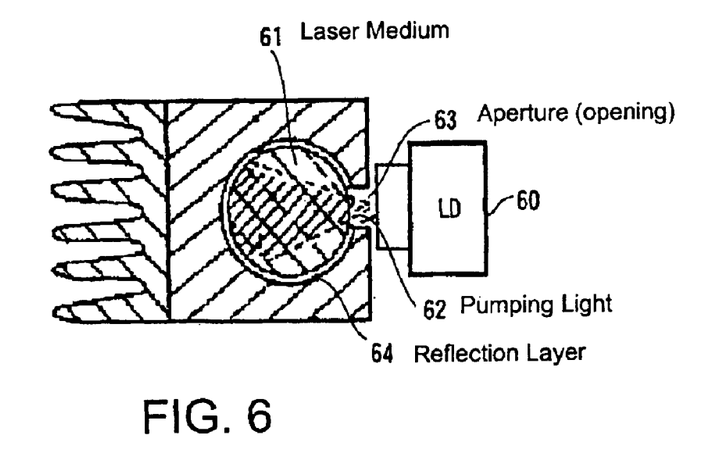
FIG. 6 is a cross section view of a conventional solid state laser cut in the plane perpendicular to the direction of the laser oscillation axis.

As shown in FIG. 6, the laser comprises a reflection layer 64 for enclosing the circumference of a cylindrical laser medium 61 along its optical axis and an opening 63 in a part of the reflection layer 64 for directing a pumping light 62 from a LD 60 into the laser medium 61. The reflection layer 64 covers almost the entire outer surface of the laser medium 61 except a small portion for directing the pumping light 62 from the LD 60. In this way, the pumping light 62 from the LD 60 is entrapped inside the laser medium 61 for efficient absorption of the pumping light 62 in the laser medium 61, thereby improving efficiency of oscillation energy.

Figure 7:
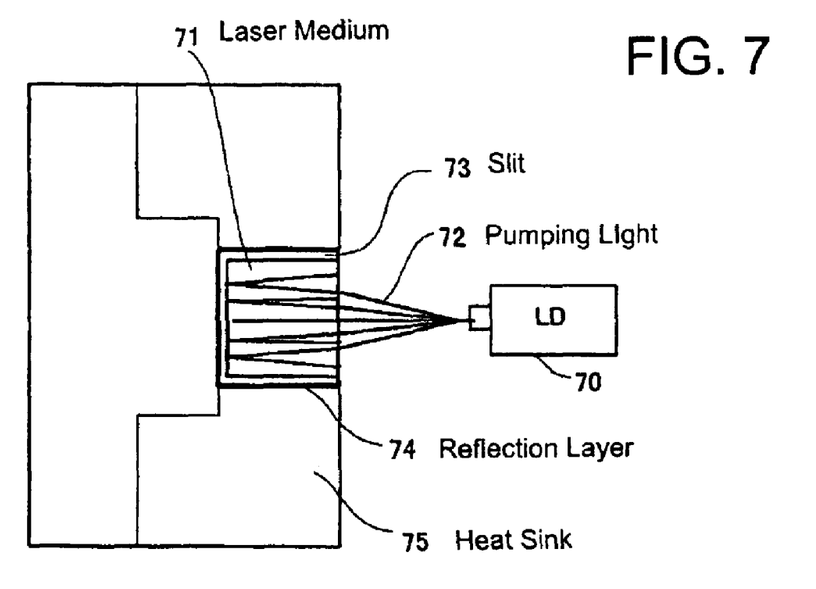
FIG. 7 is a cross section view of a conventional solid state laser using a rectangular laser medium cut in the plane perpendicular to direction of the laser oscillation axis.

As an example of the LD-pumped solid state laser for fixing the laser medium for proper alignment of the crystal axis of the laser medium in such a manner not to focus the reflection light onto a single point, there is proposed one using a rectangular rod shaped laser medium as shown in FIG. 7. The LD-pumped solid state laser comprises a reflection layer 74 covering the outer circumference of a rectangular rod shaped laser medium 71 along its optical axis and an opening 73 formed in a part of the reflection layer 74 for allowing a pumping light 72 from an LD 70 to enter the laser medium 71. Most of the outer surface of the laser medium 71 is covered by the reflection layer 74 except a small portion for receiving the pumping light 72 from the LD 70. In this way, the pumping light 72 from the LD 70 is entrapped inside the laser medium 71 for efficient absorption of the pumping light by the laser medium 71, thereby improving efficiency of oscillation energy. The use of rectangular Nd:YVO$_4$ crystal as the laser medium 74 enables to align the orientation of the optical electric field of the pumping light 72 in parallel with the c-axis of the Nd:YVO$_4$ crystal that is cut along the a-axis.

An example of a solid state laser capable of uniformly pumping the laser medium without using a focusing optical system is disclosed in, for example, the following Reference patent 3.

Reference Patent 3

Japanese Un-Examined Patent Publication No. 7-307510

Figure 8:
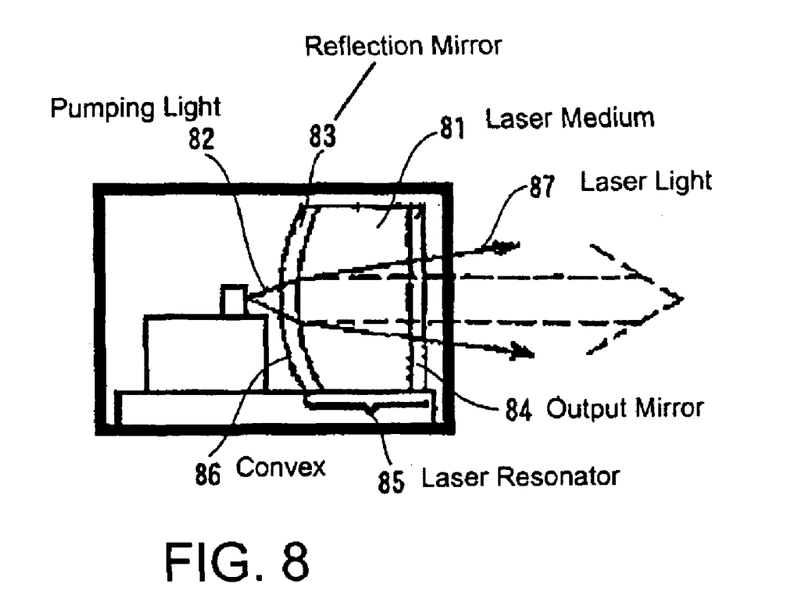
FIG. 8 is a cross section view of a conventional solid state laser having a low diffusing angle of the pumping light without using focusing optical system cut in the plane perpendicular to the direction of the laser oscillation axis.

As shown in FIG. 8, the solid state laser utilizes the particular feature of a laser medium 81 that exhibits a predetermined refractive index with respect to the pumping light. The laser medium 81 is disposed adjacent to a source of pumping light 82 and the laser medium 81 has a convex surface portion 86 at the side toward the pumping light source, thereby reducing the diffusing angle of the pumping light 82 without using a focusing optical system.

Also, an invention for effectively returning the pumping light not absorbed by a solid state laser rod (laser medium) back into the solid state laser rod is disclosed in the following Reference Patent 4.

Reference Patent 4

Japanese Un-Examined Patent Publication No. 2001-244526

Figure 9:
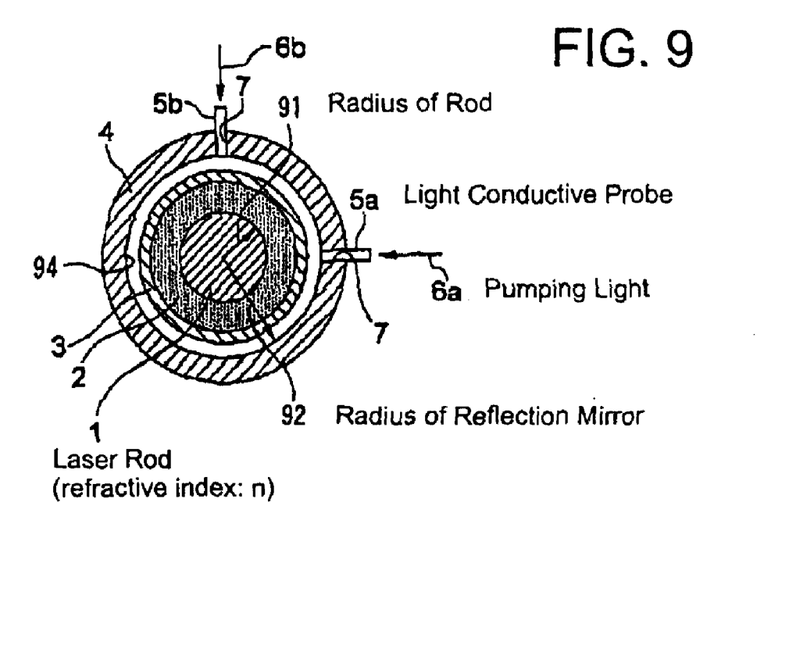
FIG. 9 is a cross section view of a conventional solid state laser with an improvement to effectively return the pumping light not absorbed by the solid state laser rod back thereto cut in the plane perpendicular to the direction of the laser oscillation axis.

Unfortunately, however, the solid state laser as disclosed in the Reference Patent 4 and shown in FIG. 9 is a multiple coaxial construction comprising a solid state laser rod 1, a gap for cooling medium 2, a cooling tube 3 and a cylindrical member 4 for providing a reflection surface. Accordingly, any pumping light not absorbed by the solid state laser rod 1 passes through the gap for the cooling medium 2 and the cooling tube 3 for at least twice, thereby attenuating the pumping light and failing to effectively utilize the reflection light.

However, all of the above mentioned conventional LD-pumped solid state lasers have a common problem that the laser medium can not be uniformly pumped by the LD.

Figure 10:
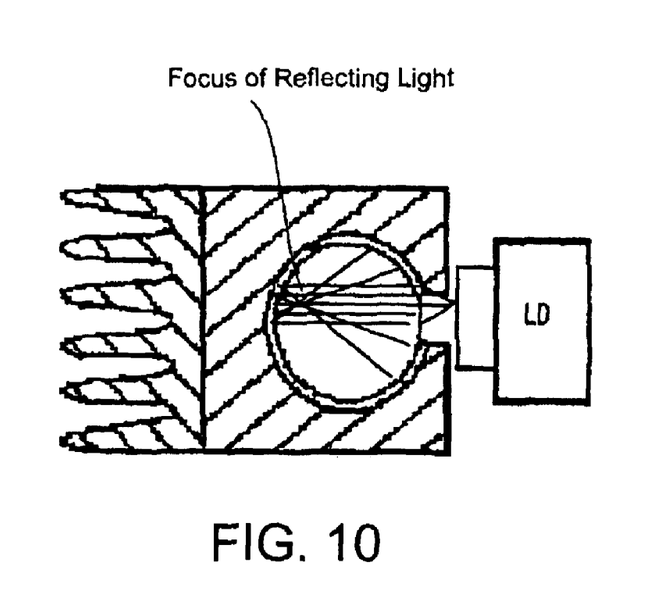
FIG. 10 is a cross section view of a conventional solid state laser cut in the plane perpendicular to the direction of the laser oscillation axis to show the pumping condition of the laser medium.

For example, in the example as shown in FIG. 6, since the reflection layer 64 is circular, the reflection light tends to be focused on a single point, thereby not uniformly pumping the laser medium 61 by the LD (See FIG. 10). On the other hand, in the example as shown in FIG. 7, although the rectangular reflection surface helps to distribute the reflected light over the entire area rather than focusing on a single point, the dispersing angle of the pumping light 72 from the LD 70 tends to cause diffusion in pumping distribution that is weaker at the outer side of the laser medium 71, thereby causing high dimension spatial mode. As a result, the beam quality may be deteriorated as mentioned in the following Reference Patent 5. It is preferable that the laser medium is pumped by the pumping light in a parallel manner.

Reference Patent 5

Japanese Un-Examined Patent Publication No. 5-335662

Other problems associated with the conventional solid state lasers include difficulty in aligning the crystal axis of the laser medium and incapability of uniformly and efficiently pumping the laser medium.

For example, in the solid state laser as shown in FIG. 6, it is difficult to align the crystal axis of the laser medium 61 because it is cylindrical. In the solid state laser as shown in FIG. 7, the laser medium 71 is rectangular which is easy to align the crystal axis, but the pumping light 72 from the LD 70 tends to largely diffuse in the laser medium 71, thereby not uniformly pumping it. In the solid state laser as shown in FIG. 8, the laser medium 81 is convex in one surface but flat in the opposite surface on which a mirror is disposed. As a result, a part of the pumping light 82 passes through the output mirror 84, thereby not efficiently pumping the laser medium 81. Additionally, no attention is paid to the relationship between the crystal axis of the laser medium 81 and the pumping light 82.

SUMMARY OF THE INVENTION

Taking the above problems of the conventional solid state lasers into consideration, it is therefore an object of the present invention to provide a solid state laser having excellent pumping efficiency and distribution of the pumping light and yet easy to align the crystal axis even in the laser medium having anisotropic property.

The solid state laser according to the present invention is directed to one comprising a solid state laser medium, a pumping light source disposed at one side of the solid state laser medium for pumping the same and a reflection portion for recovering any pumping light from the pumping light source that is not absorbed by the solid state laser medium. The solid state laser is characterized in that the solid state laser medium has the surface facing the pumping light source as a light incident surface formed in such a manner that the pumping light is in parallel in the solid state laser medium, and the surface facing the reflection portion is flat so as to return the reflected light from the reflection portion into the solid state laser medium in a parallel manner. In this particular construction, the diffusing pumping light from pumping light source is converted into parallel light inside the laser medium and any light not absorbed by the laser medium in a first pass is reflected back into the solid state laser medium, thereby improving both pumping efficiency and distribution. Also, it simplifies alignment of the crystal axis by making the flat surface of the solid state laser medium in contact with the reflection portion.

The solid state laser according to the present invention having the above construction exhibits various advantages. It is simple by not using any optical component, enables to pump the laser medium uniformly and in high density, and provides highly efficient and high beam quality laser oscillation. Additionally, in case of using anisotropic laser medium having different performances depending on the axial directions, the laser medium can be pumped efficiently because the laser medium can be aligned easily by using the flat surface facing the reflection portion.

DETAILED DESCRIPTION OF PREFERRED EMBODIMENT

Now, a presently preferred embodiment of the present invention will be described in detail by reference to the accompanying drawings.

Figure 1:
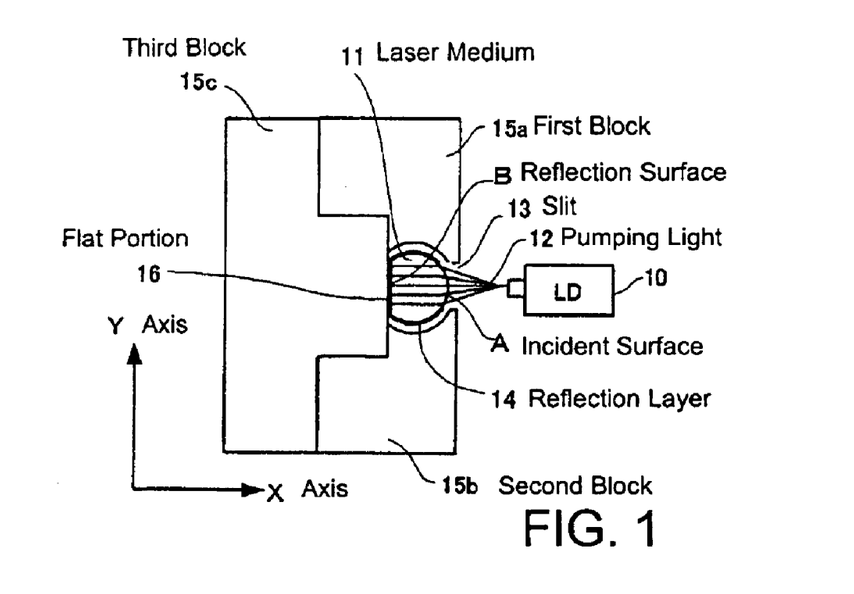
FIG. 1 is a cross section view of the solid state laser cut in the plane perpendicular to the laser oscillation axis.
Figure 2:
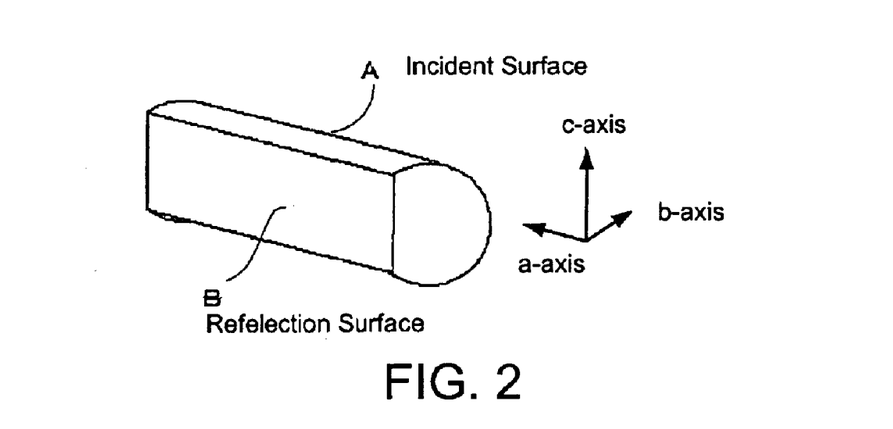
FIG. 2 is a perspective view of the laser medium to be used in the solid state laser according to the present invention.
Figure 3:
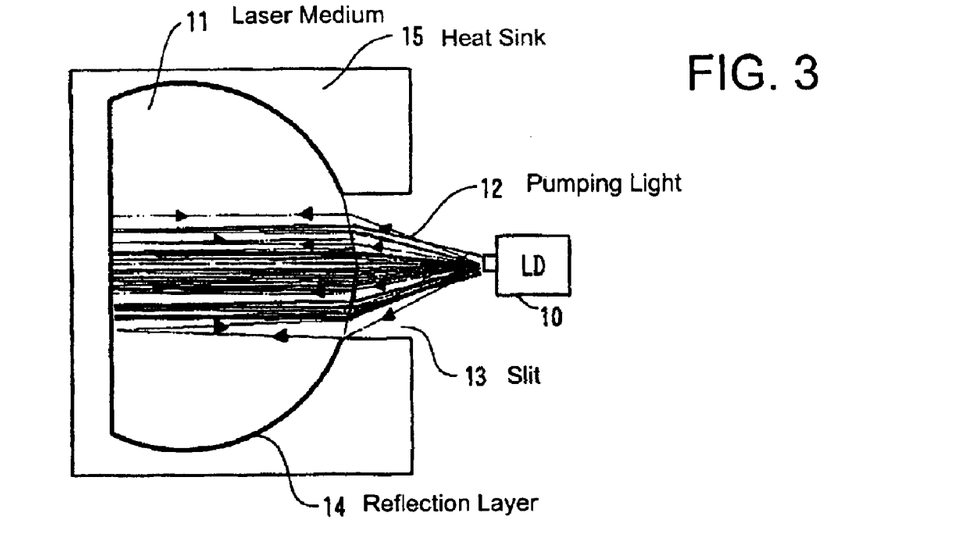
FIG. 3 is a light tracing chart when the laser medium is pumped in the solid state laser according to the present invention.

FIG. 1 is a cross section view of the LD-pumped solid state laser according to an embodiment of the present invention (referred to as the embodied solid state laser below) in the plane perpendicular to the direction of laser oscillation axis. FIG. 2 shows a perspective view of the laser medium to be used in the embodied solid state laser. FIG. 3 shows a trace of pumping light when the embodied solid state laser is pumped.

The embodied solid state laser comprises a LD 10, a laser medium 11 and a heat sink 15 comprising a first block 15a, second block 15b and a third block 15c.

The LD 10 used as the pumping light source 12 is 40 watts in output, 40 degrees in total diffusing angle (half-amplitude-width) and 800 nm in wavelength. Note that 1064 nm thick Ar coating and optical polishing are made on the laser oscillation edge surface for reducing loss of laser oscillation.

The laser medium 11 is generally D-shaped in cross section in perpendicular to the direction of laser oscillation axis. In other words, the surface facing the LD 10 that defines an incident surface A is arcuate, while the surface opposite to the incident surface A is flat. It can be said that the incident surface A is made convex similar to that of a convex lens. Furthermore, the laser medium 11 is formed with a reflection layer 14 except the portion opposed to the LD 10 which is the pumping light source. The reflection layer 14 on the flat portion constitutes a reflection surface B. The laser medium 11 is a crystal, more concretely Nd:YVO$_4$ that is cut in the a-axis and doped with Nd of 0.5 at %. As shown in FIG. 2, the c-axis of the crystal of the laser medium 11 is parallel with the flat portion. The laser medium 11 is a rod of 1.5 mm in diameter and 12 mm in length with a part of the side surface cut away in flat at the location 0.5 mm toward the center. The laser medium 11 absorbs the pumping light 12 from the LD 10 for generating and amplifying the light having a predetermined wavelength. Such materials as Nd:YAG, Nd:YLF, Nd:GdVO$_4$, Yb:YAG, Yb:YLF, Yb:GdVO$_4$, Er:YVO$_4$, Er:YAG, Er:YLF, Re:GdVO$_4$, Ho:YVO$_4$, Ho:YAG, Ho:YLF, Ho:GdVO$_4$, Ti:AlO$_3$ or the like may be utilized as the laser medium 11.

The first block 15a, the second block 15b and the third block 15c that are made from, for example, copper are disposed in such a manner to enclose the laser medium 11. Additionally, there is formed a slit 13 between the first block 15a and the second block 15b so that the pumping light 12 from the LD 10 is inputted into the laser medium 11. The third block 15c is formed with a flat portion 16 to be used for alignment of the crystal axis of the laser medium 11 by abutment of its flat portion against such flat portion 16. Although not shown in the drawings, cooling water is forced to circulate in each of the blocks for indirectly cooling the laser medium 11 and the LD 10. Also, in order to improve the cooling efficiency, the contact portion with the laser medium 11 is well polished to remove unevenness, thereby enhancing adherence between the laser medium 11 and the heat sink. Additionally, the inner surfaces of the first block 15a, the second block 15b and the third block 15c are well polished to form mirror surfaces and a highly reflecting film coating such as an Au coating is preferably applied thereto.

In the embodied solid state laser having the above mentioned construction, when the pumping light 12 is inputted onto the incident surface A of the laser medium 11 of D-shaped rod at an output end at the distance of 0.5 mm, the total diffusing angle of the pumping light can be reduced to 5 degrees or less. This means that the pumping light 12 is substantially parallel and the optical axis of the pumping light 12 passes through the center of the laser medium 11. The pumping light 12 propagates into the laser medium 11 in substantially parallel while being absorbed by the laser medium 11. About 30% of the pumping light 12 which is not absorbed by the laser medium 11 in the first propagation is reflected by the flat reflection surface B in substantially parallel with the incident light, thereby being substantially superimposed with the incident light to pump the laser medium 11 and significantly increasing the pumping efficiency.

Since the polarization surface of the pumping light 12 is parallel with the Y axis in FIG. 1, the polarization surface of the pumping light 12 is parallel with the c-axis of the laser medium 11 by abutting the flat surface portion of the laser medium 11 against the third block 15c. Accordingly, the absorbing rate of the pumping light 12 by the laser medium 11 and the induced emission cross section area of the laser oscillation are maximized, thereby achieving efficient laser oscillation even if Nd:YVO$_4$ having anisotropic characteristic is utilized as the laser medium 11. Now, anisotropy of the Nd:YVO$_4$ crystal will be described by way of a concrete example. If the laser medium made from an Nd:YVO$_4$ crystal is rotated 90 degrees from the crystal axis that can be pumped in the maximum efficiency, absorption rate of the pumping light (in the range of about 808 nm) is significantly decreased by about ¼~⅕ and the induced emission cross section area is also decreased by about ¼~⅕. However, in the present embodiment, since the side surface of the laser medium 11 is made partially flat against which the flat surface portion 16 of the third block 15c abuts, thereby easily aligning the crystal axis with the axial direction to pump in the maximum efficiency.

As apparent from the above description, according to the embodied solid state laser, the incident surface A of the laser medium 11 is shaped so that the diffusing pumping light 12 from the LD 10 is converted into parallel light, thereby enabling to pump the laser medium uniformly and in high density with a simple construction that requires no optical system for converting the pumping light 12 into parallel light. Moreover, since almost the entire outer surface of the laser medium 11 is covered with the reflection layer 14, the pumping light 12 can be entrapped inside the laser medium 11, thereby enabling to efficiently pump the laser medium. Additionally, since a part of the side surface of the laser medium 11 is made flat, it is easy to align the crystal axis. As a result, it is possible to efficiently pump the crystal having anisotropic characteristic such as, for example, Nd:YVO$_4$. This means that the embodied solid state laser can perform laser oscillation in high efficiency and high beam quality by using either anisotropic or isotropic laser medium.

Figure 4:
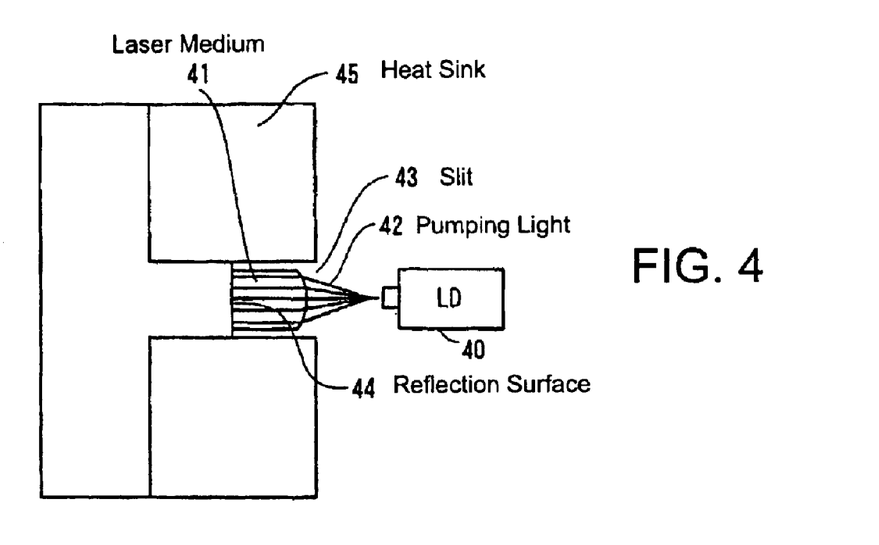
FIG. 4 is a modified example of the solid state laser according to the present invention.
Figure 5:
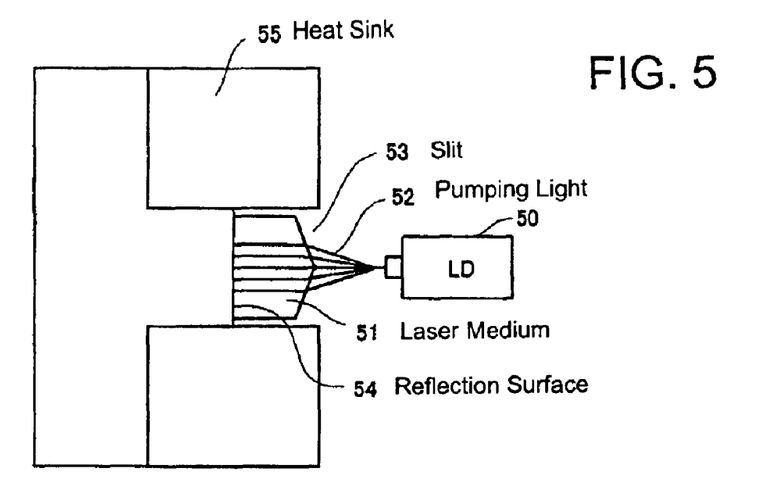
FIG. 5 is a further modified example of the solid state laser according to the present invention.

It is to be noted that the shape of the laser medium is not limited to the particular shape as shown in FIG. 2, i.e., D-shape in cross section in perpendicular to the direction of oscillation axis. Similar advantages can be enjoyed as long as the laser medium has the incident surface for converting the diffusing incident light into parallel light and the reflection surface is flat. FIG. 4 and FIG. 5 show modifications of the laser medium different from the one that is shown in FIG. 1 and FIG. 2. In the laser medium 41 as shown in FIG. 4, both upper and lower surfaces of the D-shaped rod as shown in FIG. 2 are cut off. In the laser medium 51 as shown in FIG. 5, the incident surface in FIG. 4 is replaced by symmetrical upper and lower flat surfaces, thereby providing generally pentagonal cross section as a whole. In FIG. 4 and FIG. 5, all constituent elements other than the laser media 41 and 51 are identical to those in FIG. 1.

Although the presently preferred embodiment of the present invention has been described hereinabove in greater detail, it is to be noted that the present invention should not be restricted to such embodiment. Various modifications may be made easily by a person having an ordinary skill in the art without departing from the scope and spirit of the present invention.

What is claimed is:

1. A solid state laser comprising a solid state laser medium, a pumping light source disposed by the side surface of said solid state laser medium for pumping said solid state laser medium and a reflection portion for returning back to said solid state laser medium said pumping light from said pumping light source that is not absorbed by said solid state laser medium, characterized in that the surface of said solid state laser medium facing said pumping light source is a light incident surface for making the pumping light parallel in said solid state laser medium, and the surface of said solid state laser medium facing said reflection portion is flat for returning the reflection light from said reflection portion back to said solid state laser medium in a parallel manner.

2. A solid state laser medium of claim 1, wherein the shape of the light incident surface portion of said solid state laser medium is arcuate in cross section in perpendicular to the side surface.

3. A solid state laser of claim 1, wherein the shape of the light incident surface portion of said solid state laser medium is polygonal.

4. A solid state laser of claim 1, wherein the entire surface of said solid state laser medium is formed with a reflection layer except the portion facing said pumping light source and the reflection layer constitutes said reflection portion.

5. A solid state laser of claim 1, wherein the outer circumference of said solid state laser medium is covered by a heat sink except the portion facing said pumping light source, and the surface of said heat sink facing the flat surface of said solid state laser medium is made as a mirror surface that constitutes said reflection portion.

6. A solid state laser of claim 1, wherein said solid state laser medium is made from an anisotropic crystal and is disposed so that the c-axis of the crystal is substantially parallel with the polarization of said pumping light from said pumping light source.

7. A solid state laser of claim 1, wherein said solid state laser medium is made from an isotropic crystal and is disposed so that the pumping light from said pumping light source is substantially parallel with the crystal.

8. A solid state laser of claim 6, wherein the crystal is selected from the group consisting of Nd:YVO$_4$, Nd:YAG, Nd:YLF, Nd:GdV$_4$, Yb:YVO$_4$, Yb:YAG, Yb:YLF, Yb:GdVO$_4$, Er:YVO$_4$, Er:YLF, Er:GdVO$_4$, Ho:YVO$_4$, Ho:YAG, Ho:YLF, Ho:GdVO$_4$ and Ti:AlO$_3$ and said pumping light source is made of a semiconductor laser.

9. A solid state laser of claim 6, wherein said solid state laser medium is a D-shaped rod having a flat portion, the flat portion of said D-shaped rod acting as said reflection portion of said pumping light.

10. A solid state laser of claim 1, wherein said solid state laser medium is D-shaped rod having a flat portion and is made from an anisotropic crystal having c-axis which is aligned in parallel with the flat portion of said D-shaped rod, said solid state laser medium is covered by a heat sink except the portion facing said pumping light source, and said heat sink has a flat surface facing the flat portion of said D-shaped rod, thereby the c-axis of the crystal is aligned in substantially parallel with the polarization of said pumping light from said pumping light source.

* * * * *